United States Patent
Watanabe

(10) Patent No.: US 8,620,501 B2
(45) Date of Patent: Dec. 31, 2013

(54) ENGINE STARTING SYSTEM AND ENGINE STARTING METHOD

(75) Inventor: Masato Watanabe, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 371 days.

(21) Appl. No.: 13/080,827

(22) Filed: Apr. 6, 2011

(65) Prior Publication Data

US 2011/0257823 A1 Oct. 20, 2011

(30) Foreign Application Priority Data

Apr. 20, 2010 (JP) ................................. 2010-096747

(51) Int. Cl.
*B60L 9/00* (2006.01)

(52) U.S. Cl.
USPC .............................. 701/22; 701/110; 701/112

(58) Field of Classification Search
USPC ............... 701/22, 110, 112; 123/350, 339.24, 123/179.4; 180/65.265, 65.285; 477/107; 318/432; 60/778
See application file for complete search history.

(56) References Cited

U.S. PATENT DOCUMENTS

| | | | |
|---|---|---|---|
| 7,869,932 B2 * | 1/2011 | Boesch | 701/112 |
| 8,251,870 B2 * | 8/2012 | Nihei et al. | 477/107 |
| 2009/0298644 A1 * | 12/2009 | Nihei et al. | 477/107 |
| 2009/0314255 A1 * | 12/2009 | Boesch | 123/339.24 |
| 2011/0088659 A1 * | 4/2011 | Wang et al. | 123/350 |

FOREIGN PATENT DOCUMENTS

| | | |
|---|---|---|
| JP | 5-270294 | 10/1993 |
| JP | 2007-246030 | 9/2007 |
| JP | 2009-137401 | 6/2009 |

OTHER PUBLICATIONS

U.S. Appl. No. 14/085,278, filed Nov. 20, 2013.
U.S. Appl. No. 14/085,303, filed Nov. 20, 2013.

* cited by examiner

*Primary Examiner* — Behrang Badii
(74) *Attorney, Agent, or Firm* — Finnegan, Henderson, Farabow, Garrett & Dunner, LLP

(57) ABSTRACT

A starting system of an engine mounted in a vehicle capable of running using torque output from an electric motor includes a estimation portion that estimates engine speed and output torque of the engine when the engine is driven to realize the power requested by the driver, a comparing portion that compares a time for which the engine continues to be stopped with a first time and a second time that is longer than the first time, a first starting portion that starts the engine when estimated engine speed is greater than first speed and less than second speed, and the estimated output torque is greater than first value and less than second value, and a second starting portion that starts the engine when the time for which the engine continues to be stopped is longer than the second time.

5 Claims, 11 Drawing Sheets

ENGINE STARTING SYSTEM AND ENGINE STARTING METHOD

INCORPORATION BY REFERENCE

The disclosure of Japanese Patent Application No. 2010-096747 filed on Apr. 20, 2010, including the specification, drawings and abstract is incorporated herein by reference in its entirety.

BACKGROUND OF THE INVENTION

1. Field of the Invention

The invention relates to an engine starting system and an engine starting method. More particularly, the invention relates to technology for starting an engine mounted in a vehicle that is able to run using torque output from an electric motor.

2. Description of the Related Art

A hybrid vehicle provided with an engine and an electric motor as drive sources is known. The hybrid vehicle is provided with a power storage device such as a battery that stores electric power to be supplied to the electric motor. Electric power generated by a generator driven by the engine and electric power regenerated using the electric motor during deceleration of the vehicle, for example, are stored in the battery. In a plug-in hybrid vehicle, the battery is also able to be charged with electric power supplied from an external power supply outside the vehicle.

A hybrid vehicle is able to run using one or both of the engine and the electric motor as the drive source according to the operating state of the vehicle and the like. Therefore, when the state-of-charge (SOC) of the battery is large, for example, the engine may be stopped and the vehicle may be run using only the electric motor as the drive source. The driver may also be able to select a mode to run using only the electric motor as the drive source by operating a switch.

Therefore, in a hybrid vehicle, the time that the engine continues to be stopped, i.e., remains stopped, tends to be long. In particular, in a plug-in hybrid vehicle, if the battery is charged often using an external power supply outside the vehicle, there will be no need to drive the engine to generate power to charge the battery. Therefore, it is possible that the engine will almost never be driven. If the engine is not driven for an extended period of time, the amount of evaporated fuel (vapor) from the fuel tank and the like that is trapped in a canister may become excessive. Also, lubrication may become insufficient because the oil pump is not driven. Therefore, technology that forcibly drives the engine at regular intervals has been proposed.

Japanese Patent Application Publication No. 5-270294 (JP-A-5-270294) describes a control apparatus for an electric vehicle, that forcibly drives an internal combustion engine when it is detected that the internal combustion engine has not been used for a predetermined period of time.

However, if the engine is driven at regular intervals, fuel efficiency may decrease from driving the engine.

SUMMARY OF THE INVENTION

The invention thus provides an engine starting system and an engine starting method capable of suppressing a decrease in fuel efficiency due to forcibly driving an engine.

A first aspect of the invention relates to a starting system of an engine mounted in a vehicle capable of running using torque output from an electric motor. This starting system includes detection portion that detects power requested by a driver; estimation portion that estimates engine speed and output torque of the engine when the engine is driven to realize the power requested by the driver; comparing portion that compares a time for which the engine continues to be stopped with a first time and a second time that is longer than the first time; determining portion that determines whether the estimated engine speed is greater than a first speed and less than a second speed that is greater than the first speed, and the estimated output torque is greater than a first value and less than a second value that is greater than the first value, when the time for which the engine continues to be stopped is longer than the first time and shorter than the second time; first starting portion that starts the engine when the estimated engine speed is greater than the first speed and less than the second speed, and the estimated output torque is greater than the first value and less than the second value; and second starting portion that starts the engine when the time for which the engine continues to be stopped is longer than the second time.

According to this structure, if the time for which the engine continues to be stopped is longer than the second time, the engine is forcibly started. Meanwhile, if the engine speed is greater than the first speed and less than the second speed, and the output torque of the engine is greater than the first value and less than the second value, when the time for which the engine continues to be stopped is longer than the first time and shorter than the second time, the engine is started. As a result, the engine can be driven in a fuel efficient operating range, for example. Therefore, a decrease in fuel efficiency due to forcibly driving the engine can be suppressed.

A second aspect of the invention relates to a starting system of an engine mounted in a vehicle capable of running using torque output from an electric motor. This starting system includes detection portion that detects power requested by a driver; estimation portion that estimates efficiency of the engine when the engine is driven to realize the power requested by the driver; comparing portion that compares a time for which the engine continues to be stopped with a first time and a second time that is longer than the first time; determining portion that determines whether the estimated efficiency is equal to or greater than a preset efficiency, when the time for which the engine continues to be stopped is longer than the first time and shorter than the second time; starting portion that starts the engine when the estimated efficiency is equal to or greater than the preset efficiency; and second starting portion that starts the engine when the time for which the engine continues to be stopped is longer than the second time.

According to this structure, if the time for which the engine continues to be stopped is longer than the second time, the engine is forcibly started. Meanwhile, if the efficiency of the engine is equal to or greater than a preset efficiency when the time for which the engine continues to be stopped is longer than the first time and shorter than the second time, the engine is started. As a result, the engine can be driven in a fuel efficient operating range. Therefore, a decrease in fuel efficiency due to forcibly driving the engine can be suppressed.

A third aspect of the invention relates to a starting system of an engine mounted in a vehicle capable of running using torque output from an electric motor. This starting system includes detection portion that detects power requested by a driver; estimation portion that estimates efficiency of a hybrid system that includes the electric motor and the engine, when the engine is driven to realize the power requested by the driver; comparing portion that compares a time for which the engine continues to be stopped with a first time and a second time that is longer than the first time; determining portion that determines whether the estimated efficiency is equal to or greater than a preset efficiency, when the time for which the engine continues to be stopped is longer than the first time and shorter than the second time; and second starting portion that starts the engine when the time for which the engine continues to be stopped is longer than the second time.

According to this structure, if the time for which the engine continues to be stopped is longer than the second time, the engine is forcibly started. Meanwhile, if the efficiency of the hybrid system that includes the electric motor and the engine is equal to or greater than a preset efficiency when the time for which the engine continues to be stopped is longer than the first time and shorter than the second time, the engine is forcibly started. As a result, the engine can be forcibly driven in an operating range with good fuel efficiency for the vehicle as a whole. Therefore, a decrease in fuel efficiency due to forcibly driving the engine can be suppressed.

A fourth aspect of the invention relates to a starting method of an engine mounted in a vehicle capable of running using torque output from an electric motor. This starting method includes detecting power requested by a driver; estimating engine speed and output torque of the engine when the engine is driven to realize the power requested by the driver; comparing a time for which the engine continues to be stopped with a first time and a second time that is longer than the first time; determining whether the estimated engine speed is greater than a first speed and less than a second speed that is greater than the first speed, and the estimated output torque is greater than a first value and less than a second value that is greater than the first value, when the time for which the engine continues to be stopped is longer than the first time and shorter than the second time; starting the engine when the estimated engine speed is greater than the first speed and less than the second speed, and the estimated output torque is greater than the first value and less than the second value; and starting the engine when the time for which the engine continues to be stopped is longer than the second time.

A fifth aspect of the invention relates to a starting method of an engine mounted in a vehicle capable of running using torque output from an electric motor. This starting method includes detecting power requested by a driver; estimating efficiency of the engine when the engine is driven to realize the power requested by the driver; comparing a time for which the engine continues to be stopped with a first time and a second time that is longer than the first time; determining whether the estimated efficiency is equal to or greater than a preset efficiency, when the time for which the engine continues to be stopped is longer than the first time and shorter than the second time; starting the engine when the estimated efficiency is equal to or greater than the preset efficiency; and starting the engine when the time for which the engine continues to be stopped is longer than the second time.

A sixth aspect of the invention relates to a starting method of an engine mounted in a vehicle capable of running using torque output from an electric motor. This starting method includes detecting power requested by a driver; estimating efficiency of a hybrid system that includes the electric motor and the engine, when the engine is driven to realize the power requested by the driver; comparing a time for which the engine continues to be stopped with a first time and a second time that is longer than the first time; determining whether the estimated efficiency is equal to or greater than a preset efficiency, when the time for which the engine continues to be stopped is longer than the first time and shorter than the second time; and starting the engine when the time for which the engine continues to be stopped is longer than the second time.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
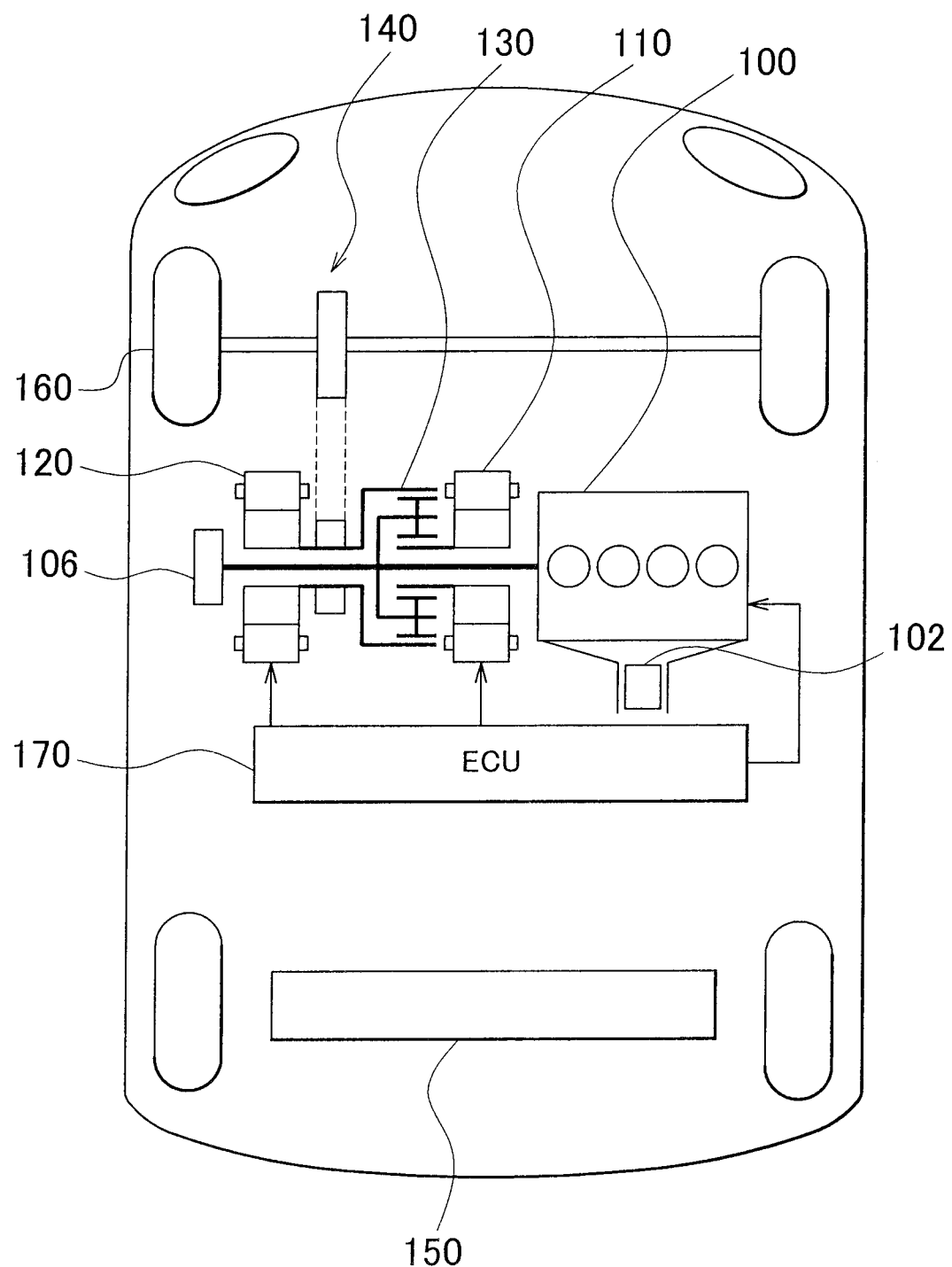
FIG. 1 is a block diagram schematically showing a plug-in hybrid vehicle.

Example embodiments of the present invention will be described in greater detail below with reference to the accompanying drawings. In the following description, like parts will be denoted by like reference characters and referred to by the same nomenclature and have the same functions. Therefore, detailed descriptions of those parts will not be repeated.

<First Example Embodiment>

A plug-in hybrid vehicle is provided with an engine 100, a first motor-generator 110, a second motor-generator 120, a power split device 130, a reduction gear 140, and a battery 150, as shown in FIG. 1.

The engine 100, the first motor-generator 110, the second motor-generator 120, and the battery 150 are all controlled by an ECU (Electronic Control Unit) 170. The ECU 170 may also be divided into a plurality of ECUs.

This vehicle runs using torque from at least one of the engine 100 or the second motor-generator 120. That is, one or both of the engine 100 and the second motor-generator 120 is automatically selected as the drive source according to the operating state.

For example, when the accelerator operation amount is small or when the vehicle speed is low or the like, the plug-in hybrid vehicle runs using only the second motor-generator 120 as the drive source. In this case, the engine 100 is stopped.

Also, when the accelerator operation amount is large, when the vehicle speed is high, or when the state-of-charge (SOC) of the battery 150 is low or the like, the engine 100 is driven. In this case, the plug-in hybrid vehicle runs using only the engine 100 or both the engine 100 and the second motor-generator 120 as the drive source.

Moreover, this vehicle runs switching between a CS (Charge Sustaining) mode and a CD (Charge Depleting) mode automatically, for example. Incidentally, the CS mode and the CD mode may also be switched manually.

In the CS mode, the plug-in hybrid vehicle runs while maintaining the electric power stored in the battery 150 at a predetermined target value.

In the CD mode, the plug-in hybrid vehicle runs mainly using only the driving force of the second motor-generator 120 using electric power, and does not maintain the electric power stored in the battery 150 for running. However, in the CD mode, when the accelerator operation amount is high or when the vehicle speed is high or the like, the engine 100 may be driven to provide assist driving force.

The CS mode may also be referred to as an HV mode. Similarly, the CD mode may also be referred to as an EV mode. The CS mode and the CD mode will both be described in greater detail later.

The engine 100 is an internal combustion engine. A crankshaft that serves as an output shaft is rotated by the combustion of an air-fuel mixture in a combustion chamber. Exhaust gas discharged from the engine 100 is discharged out of the vehicle after first being purified by a catalyst 102. The catalyst 102 displays a purifying effect by being warmed up to a specific temperature. The catalyst 102 is warmed up using the heat of the exhaust gas. The catalyst 102 is a three-way catalyst, for example.

The plug-in hybrid vehicle is also provided with an oil pump 106 that is connected to the output shaft of the engine 100 so as to be driven by the engine 100. The oil pump 106 pumps oil to lubricate the axles and the differential gear and the like of the drive train.

The engine 100, the first motor-generator 110, and the second motor-generator 120 are all connected via the power split device 130. Power generated by the engine 100 is split into two paths by the power split device 130. One path is a path for driving front wheels 160 via the reduction gear 140. The other path is a path for driving the first motor-generator 110 to generate electric power.

The first motor-generator 110 is a three-phase alternating current motor that has three coils, i.e., a U-phase coil, a V-phase coil, and a W-phase coil. The first motor-generator 110 generates electric power using power from the engine 100 that has been split by the power split device 130. The electric power generated by the first motor-generator 110 is used as the situation demands according to the running state of the vehicle and the SOC of the battery 150. For example, during normal running, the electric power generated by the first motor-generator 110 is used directly to drive the second motor-generator 120. On the other hand, when the SOC of the battery 150 is lower than a preset value, the electric power generated by the first motor-generator 110 is converted from alternating current to direct current by an inverter that will be described later. Then the voltage is regulated by a converter that will also be described later, and the power is stored in the battery 150.

When the first motor-generator 110 is used as a generator, the first motor-generator 110 generates negative torque. Here, negative torque refers to torque that becomes a negative load on the engine 100. When the first motor-generator 110 receives a supply of power and functions as a motor, the first motor-generator 110 generates positive torque. Here, positive torque is torque that does not become a load on the engine 100, i.e., torque that assists with the rotation of the engine 100. Incidentally, this is also true for the second motor-generator 120.

The second motor-generator 120 is a three-phase alternating current motor that has three coils, i.e., a U-phase coil, a V-phase coil, and a W-phase coil. The second motor-generator 120 is driven by at least one of electric power stored in the battery 150 or electric power generated by the first motor-generator 110.

The driving force of the second motor-generator 120 is transmitted to the front wheels 160 via the reduction gear 140. Accordingly, the second motor-generator 120 assists the engine 100 or runs the vehicle using the driving force from the second motor-generator 120. That is, the plug-in hybrid vehicle can be run using the electric power stored in the battery 150. Incidentally, rear wheels may be driven instead of, or in addition to, the front wheels 160.

During regenerative braking of the plug-in hybrid vehicle, the second motor-generator 120 is driven by the front wheels 160 and the second motor-generator 120 operates as a generator. As a result, the second motor-generator 120 operates as a regenerative brake that converts braking energy into electric power. The electric power generated by the second motor-generator 120 is stored in the battery 150.

The power split device 130 is formed by a planetary gear set that includes a sun gear, pinion gears, a carrier, and a ring gear. The pinion gears are in mesh with the sun gear and the ring gear. The carrier rotatably supports the pinion gears. The sun gear is connected to a rotating shaft of the first motor-generator 110. The carrier is connected to the crankshaft of the engine 100. The ring gear is connected to a rotating shaft of the second motor-generator 120 and to the reduction gear 140.

Because the engine 100, the first motor-generator 110, and the second motor-generator 120 are all connected via the power split device 130 formed by a planetary gear, the relationship of the rotation speeds of the engine 100, the first motor-generator 110, and the second motor-generator 120 is one in which the rotation speeds are connected by a straight line in an alignment graph. That is, the first motor-generator 110 is connected to the output shaft of the engine 100 via the power split device 130.

The battery 150 is a battery pack formed by a plurality of battery modules, each of which is formed by a plurality of battery cells integrated together, that are connected together in series. The voltage of the battery 150 is approximately 200 V, for example. Power supplied from an external power supply outside the vehicle, aside from the first motor-generator 110 and the second motor-generator 120, is charged to the battery 150. Incidentally, a capacitor may be used instead of, or in addition to, the battery 150.

Figure 2:
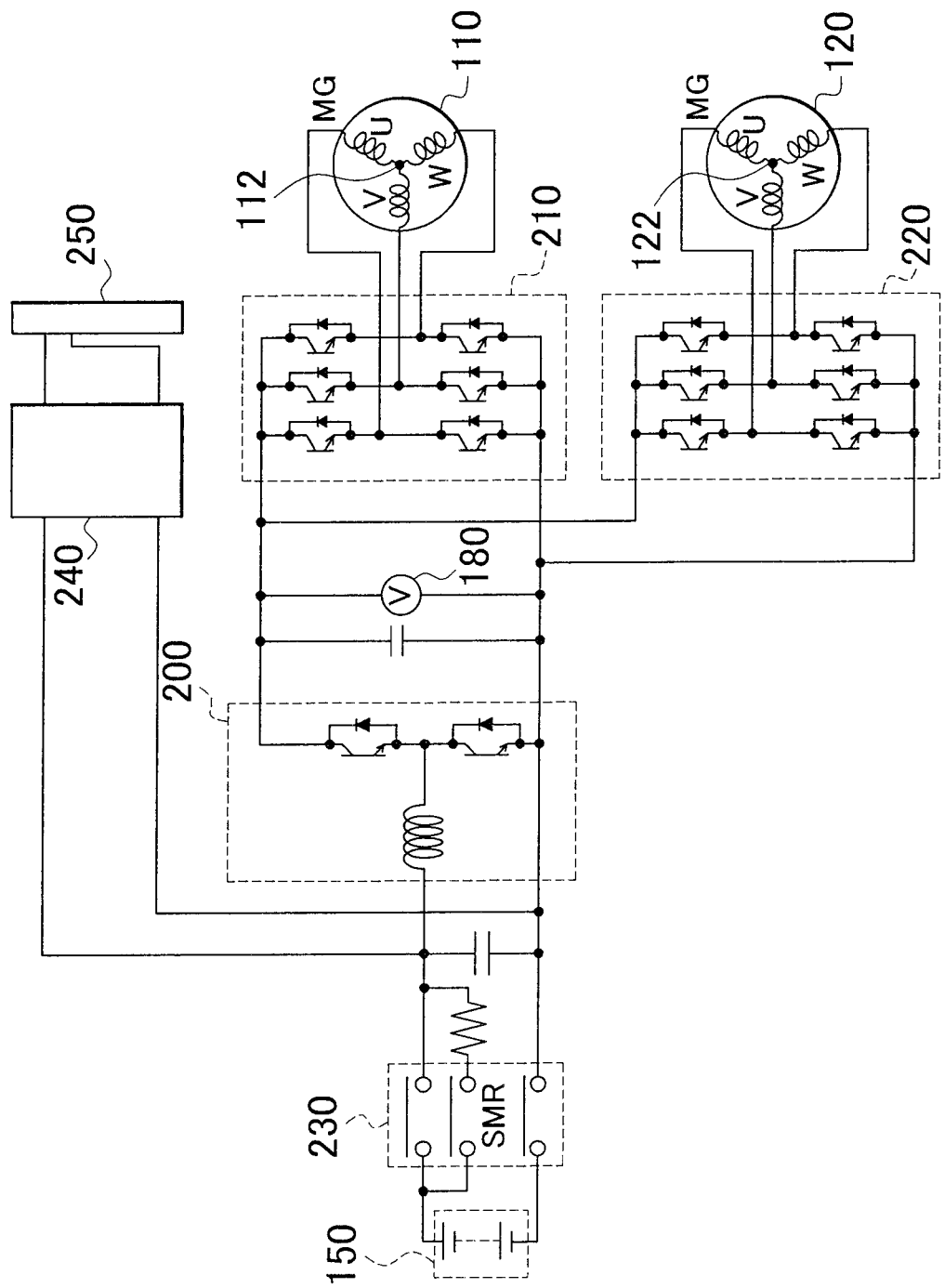
FIG. 2 is a diagram (part 1) of an electrical system of the plug-in hybrid vehicle.

The electrical system of the plug-in hybrid vehicle will now be described in greater detail with reference to FIG. 2. The plug-in hybrid vehicle includes a converter 200, a first inverter 210, a second inverter 220, an SMR (System Main Relay) 230, a charger 240, and an inlet 250.

The converter 200 includes a reactor, two npn-type transistors, and two diodes. One end of the reactor is connected to a positive terminal side of each battery, and the other end of the reactor is connected to a connecting point of the two npn-type transistors.

The two npn-type transistors are connected in series. The npn-type transistors are controlled by the ECU 170. A diode is connected between a collector and emitter of each npn-type transistor such that current flows from the emitter side to the collector side.

Incidentally, IGBTs (Insulated Gate Bipolar Transistors), for example, may be used as the npn-type transistors. Instead of the npn-type-transistors, power switching elements such as power MOSFETs (Metal Oxide Semiconductor Field-Effect Transistors) may be used.

When supplying electric power discharged from the battery 150 to the first motor-generator 110 or the second motor-generator 120, the voltage is stepped up by the converter 200. Conversely, when charging electric power generated by the first motor-generator 110 or the second motor-generator 120 to the battery 150, the voltage is stepped down by the converter 200.

A system voltage VH between the converter 200 and the inverters is detected by a voltage sensor 180. The detection result of the voltage sensor 180 is output to the ECU 170.

The first inverter 210 includes a U-phase arm, a V-phase arm, and a W-phase arm. The U-phase arm, the V-phase arm, and the W-phase arm are connected in parallel. The U-phase arm, the V-phase arm, and the W-phase arm each have two npn-type transistors that are connected in series. A diode that allows current to flow from an emitter side to a collector side is connected between a collector and emitter of each npn-type transistor. The connecting point of each npn-type transistor of each arm is connected at an end portion that is different from a neutral point 112 of each coil of the first motor-generator 110.

The first inverter 210 converts direct current supplied from the battery 150 into alternating current and then supplies this alternating current to the first motor-generator 110. Also, the first inverter 210 converts alternating current generated by the first motor-generator 110 into direct current.

The second inverter 220 includes a U-phase arm, a V-phase arm, and a W-phase arm. The U-phase arm, the V-phase arm, and the W-phase arm are connected in parallel. The U-phase arm, the V-phase arm, and the W-phase arm each have two npn-type transistors that are connected in series. A diode that allows current to flow from an emitter side to a collector side is connected between a collector and emitter of each npn-type transistor. The connecting point of each npn-type transistor of each arm is connected at an end portion that is different from a neutral point 112 of each coil of the second motor-generator 120.

The second inverter 220 converts direct current supplied from the battery 150 into alternating current and then supplies this alternating current to the second motor-generator 120. Also, the second inverter 220 converts alternating current generated by the second motor-generator 120 into direct current.

The converter 200, the first inverter 210, and the second inverter 220 are all controlled by the ECU 170.

The SMR 230 is provided between the battery 150 and the charger 240. The SMR 230 is a relay that switches between a state in which the battery 150 is connected with the electrical system and a state in which the battery 150 is disconnected from the electrical system. When the SMR 230 is open, the battery 150 is disconnected from the electrical system. When the SMR 230 is closed, the battery 150 is connected to the electrical system.

That is, when the SMR 230 is open, the battery 150 is electrically disconnected from the converter 200 and the charger 240 and the like. When the SMR 230 is closed, the battery 150 is electrically connected to the converter 200 and the charger 240 and the like.

The state of the SMR 230 is controlled by the ECU 170. For example, when the ECU 170 is turned on, the SMR 230 closes. When the ECU 170 is turned off, the SMR 230 opens.

Figure 3:
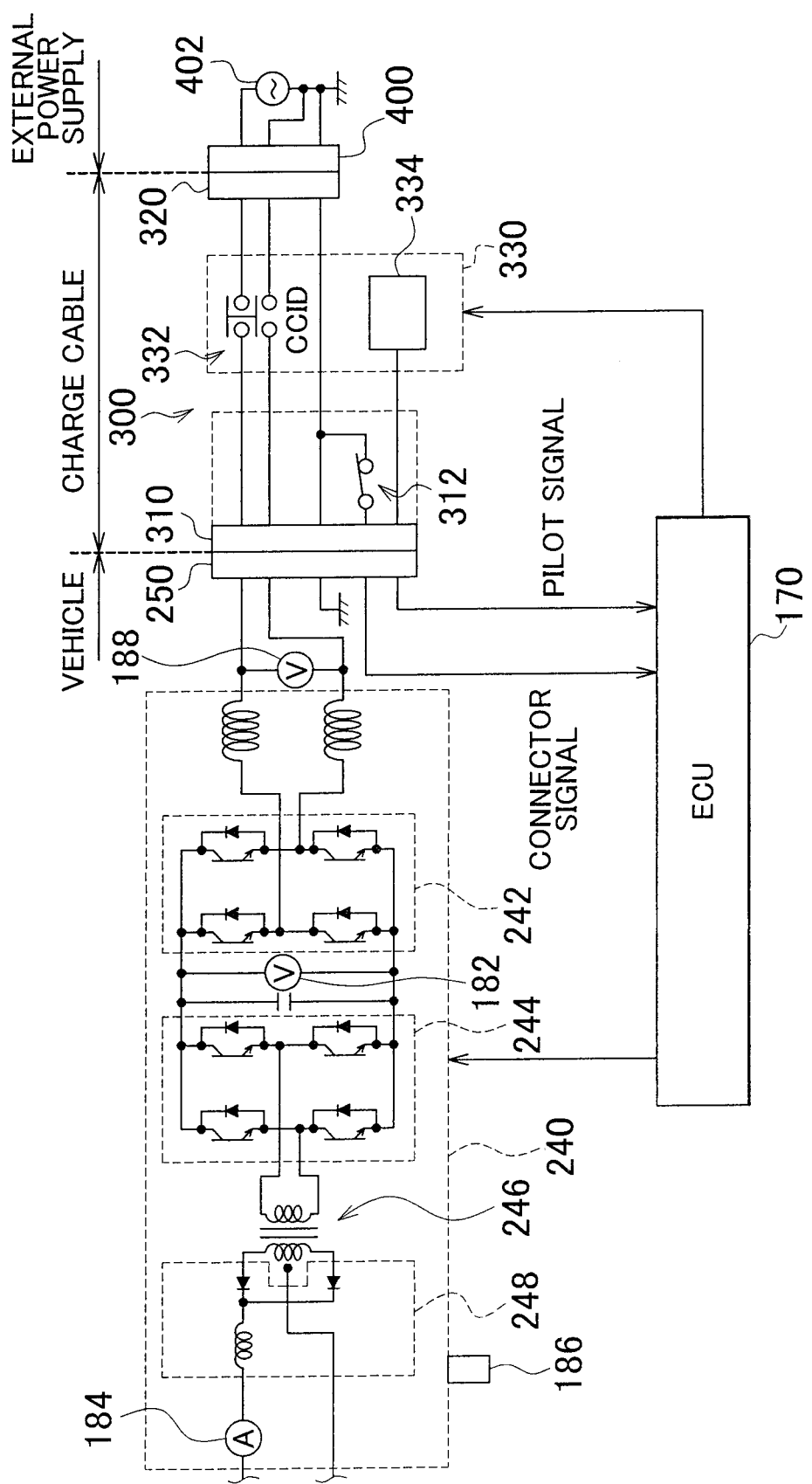
FIG. 3 is another diagram (part 2) of the electrical system of the plug-in hybrid vehicle.

The charger 240 is connected between the battery 150 and the converter 200. As shown in FIG. 3, the charger 240 includes an AC/DC converter circuit 242, a DC/AC converter circuit 244, an insulated transformer 246, and a rectifier circuit 248.

The AC/DC converter circuit 242 is formed from a single phase bridge circuit. The AC/DC converter circuit 242 converts alternating current (AC) power into direct current (DC) power based on a drive signal from the ECU 170. Moreover, the AC/DC converter circuit 242 also functions as a step-up chopper circuit that steps up the voltage by using the coil as a reactor.

The DC/AC converter circuit 244 is formed from a single phase bridge circuit. The DC/AC converter circuit 244 converts DC power into high frequency AC power based on a drive signal from the ECU 170, and outputs this high frequency AC power to the insulated transformer 246.

The insulated transformer 246 includes a core made of magnetic material, and a primary coil and a secondary coil that are wound around the core. The primary coil and the secondary coil are electrically insulated and are connected to the DC/AC converter circuit 244 and the rectifier circuit 248, respectively. The insulated transformer 246 converts high frequency AC power received from the DC/AC converter circuit 244 to a voltage level corresponding to the turn ratio of the primary coil and the secondary coil, and outputs it to the rectifier circuit 248. The rectifier circuit 248 then rectifies the AC power output from the insulated transformer 246 to DC power.

The voltage between the AC/DC converter circuit 242 and the DC/AC converter circuit 244 (i.e., the voltage between terminals of a smoothing capacitor) is detected by a voltage sensor 182 and a signal indicative of the detection result is received by the ECU 170. Also, the output current of the charger 240 is detected by a current sensor 184 and a signal indicative of the detection result is received by the ECU 170. Further, the temperature of the charger 240 is detected by a temperature sensor 186, and a signal indicative of the detection result is received by the ECU 170.

When the battery 150 is charged from an external power supply outside the vehicle, the ECU 170 generates a drive signal to drive the charger 240 and outputs it to the charger 240.

Other than functioning to control the charger 240, the ECU 170 also functions to detect a failure of the charger 240. A failure of the charger 240 is detected when, for example, the voltage detected by the voltage sensor 182, the current detected by the current sensor 184, or the temperature detected by the temperature sensor 186, becomes equal to or greater than a threshold value.

The inlet 250 is provided on a side portion of the plug-in hybrid vehicle, for example. A connector 310 of a charge cable 300 that connects the plug-in hybrid vehicle with an external power supply 402 outside the plug-in hybrid vehicle connects to the inlet 250.

The charge cable 300 that connects the plug-in hybrid vehicle to the external power supply 402 includes the connector 310, a plug 320, and a CCID (Charging Circuit Interrupt Device) 330.

The connector 310 of the charge cable 300 connects to the inlet 250 provided in the plug-in hybrid vehicle. The connector 310 is provided with a switch 312. When the switch 312 is closed while the connector 310 of the charge cable 300 is connected to the inlet 250 provided in the plug-in hybrid vehicle, a connector signal CNCT indicating that the connector 310 of the charge cable 300 is connected to the inlet 250 provided in the plug-in hybrid vehicle is input to the ECU 170.

The switch 312 opens and closes in conjunction with a retaining piece 316 that retains the connector 310 of the charge cable 300 in the inlet 250 of the plug-in hybrid vehicle. The retaining piece 316 pivots in response to the operator pushing a button 314 provided on the connector 310.

Figure 4:
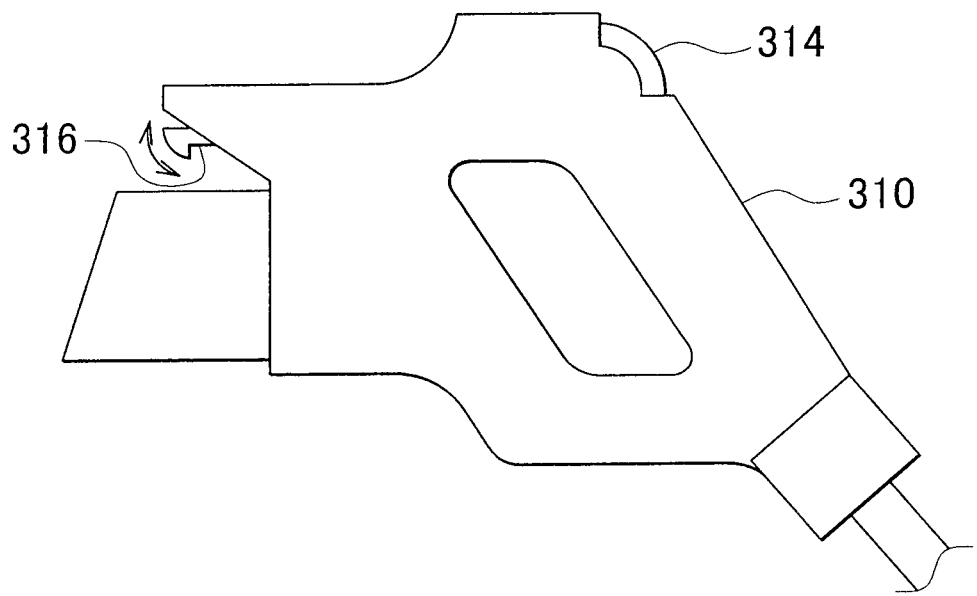
FIG. 4 is a view of a connector of a charge cable.

For example, when the operator releases a finger from the button 314 of the connector 310, shown in FIG. 4, while the connector 310 of the charge cable 300 is connected to the inlet 250 provided in the plug-in hybrid vehicle, the retaining piece 316 engages with the inlet 250 provided in the plug-in hybrid vehicle, and the switch 312 closes. When the operator presses the button 314, the retaining piece 316 disengages from the inlet 250, and the switch 312 opens. Incidentally, the method for opening and closing the switch 312 is not limited to this.

Returning now to FIG. 3, the plug 320 of the charge cable 300 connects to an outlet 400 provided in a house or the like. AC power from the external power supply 402 outside the plug-in hybrid vehicle is supplied to the outlet 400.

The CCID 330 has a relay 332 and a control pilot circuit 334. When the control pilot circuit 334 is open, the path that supplies power from the external power supply 402 outside the plug-in hybrid vehicle to the plug-in hybrid vehicle is interrupted. When the relay 332 is closed, power is able to be supplied from the external power supply 402 outside the plug-in hybrid vehicle to the plug-in hybrid vehicle. The state of the relay 332 is controlled by the ECU 170 while the connector 310 of the charge cable 300 is connected to the inlet 250 of the plug-in hybrid vehicle.

The control pilot circuit 334 outputs a pilot signal (i.e., a rectangular wave signal) CPLT to a control pilot line when the plug 320 of the charge cable 300 is connected to the outlet 400, i.e., is connected to the external power supply 402, and the connector 310 is connected to the inlet 250 provided in the plug-in hybrid vehicle. The pilot signal is oscillated from an oscillator provided in the control pilot circuit 334.

When the plug 320 of the charge cable 300 is connected to the outlet 400, the control pilot circuit 334 is able to output a constant pilot signal CPLT even if the connector 310 is disconnected from the inlet 250 provided in the plug-in hybrid vehicle. However, the ECU 170 is unable to detect a pilot signal CPLT output when the connector 310 is disconnected from the inlet 250 provided in the plug-in hybrid vehicle.

When the SMR 230 of the charge cable 300 is connected to the outlet 400 and the connector 310 is connected to the inlet 250 of the plug-in hybrid vehicle, the control pilot circuit 334 oscillates a pilot signal CPLT of a preset pulse width (i.e., duty cycle).

The current capacity that is able to be supplied is reported to the plug-in hybrid vehicle by the pulse width of the pilot signal CPLT. For example, the current capacity of the charge cable 300 is reported to the plug-in hybrid vehicle. The pulse width of the pilot signal CPLT is constant and does not rely on the voltage and the current of the external power supply 402.

Meanwhile, the pulse width of the pilot signal CPLT may differ if a different type of charge cable is used. That is, the pulse width of the pilot signal CPLT may be set for each type of charge cable.

In this example embodiment, power supplied from the external power supply 402 is charged to the battery 150 while the plug-in hybrid vehicle is connected to the external power supply 402 by the charge cable 300. During charging of the battery 150, the SMR 230 and the relay 332 in the CCID 330 are closed.

An AC voltage VAC of the external power supply 402 is detected by a voltage sensor 188 provided in the plug-in hybrid vehicle. A signal indicative of the detected voltage VAC is output to the ECU 170.

Figure 5:
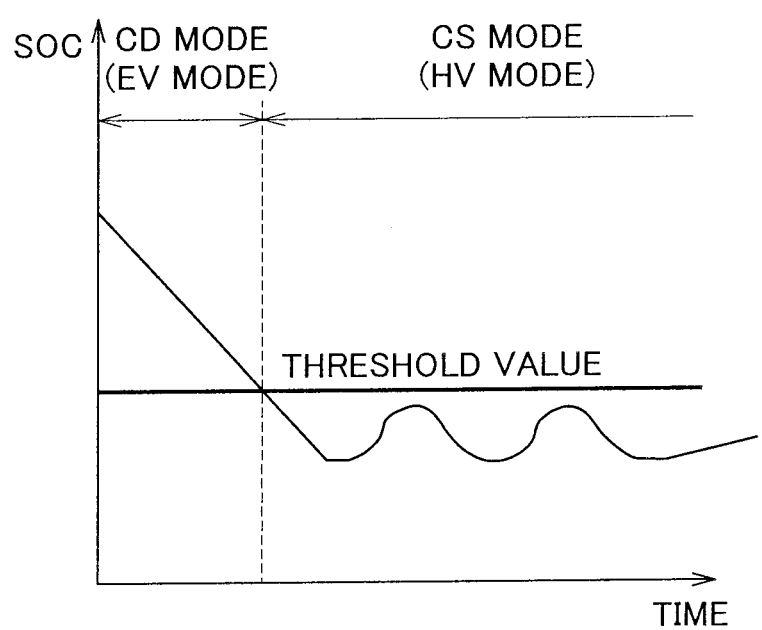
FIG. 5 is a graph showing a range in which a CS mode is selected and a range in which a CD mode is selected.

Next, the CS mode and the CD mode will be described in greater detail with reference to FIG. 5. The ECU 170 determines which mode to select from among the CS mode and the CD mode. For example, the CS mode is selected if the SOC of the battery 150 is equal to or less than a threshold value. The CD mode is selected if the SOC of the battery 150 is greater than the threshold value.

More specifically, the CS mode is selected if the SOC of the battery 150 is equal to or less than a threshold value, or if the electrical system of the plug-in hybrid vehicle stopped the last time with the CS mode being selected.

The CD mode is selected if the SOC of the battery 150 is greater than the threshold value and there is a history of the battery 150 being charged by the external power supply 402 outside the plug-in hybrid vehicle, or if the SOC of the battery 150 is greater than the threshold value and the electrical system of the plug-in hybrid vehicle stopped the last time with the CS mode being selected. Charging of the battery 150 is controlled by the ECU 170, so the determination as to whether there is a history of the battery 150 having been charged by the external power supply 402 outside the plug-in hybrid vehicle is made in the ECU 170 using a flag or the like for example. Incidentally, the method for selecting the CS mode and the CD mode is not limited to this.

In the CS mode and the CD mode, the plug-in hybrid vehicle runs by the driving force of at least one of the engine 100 or the second motor-generator 120.

Figure 6:
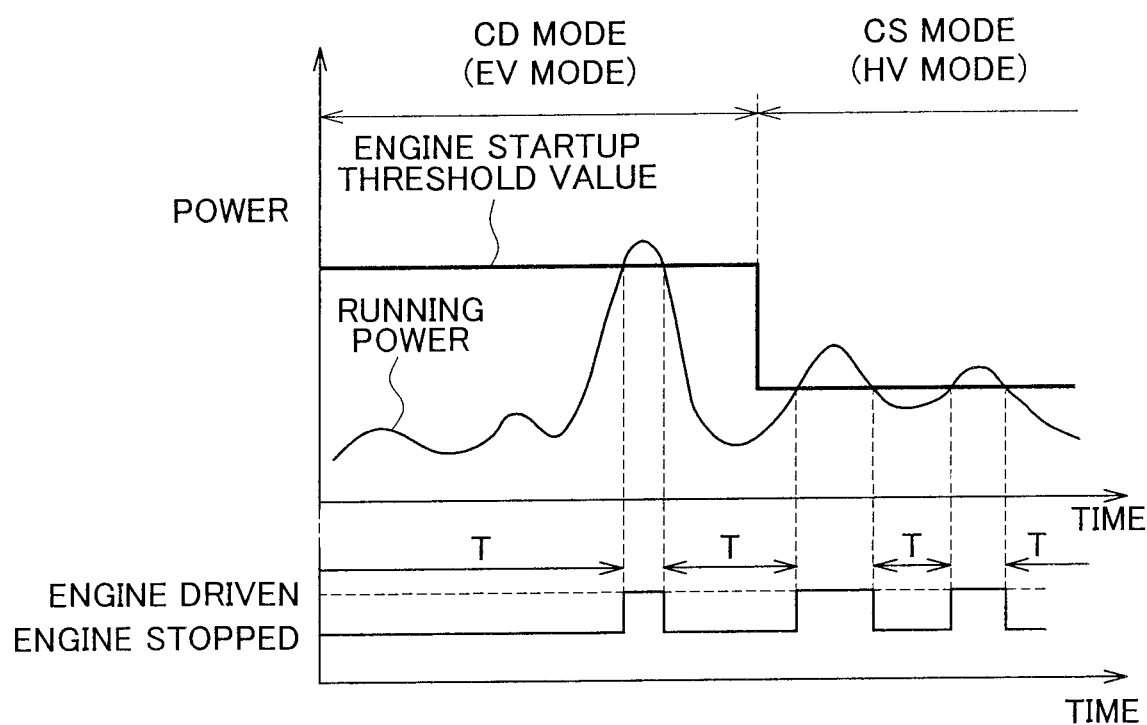
FIG. 6 is a graph showing the periods of time when the engine is stopped and periods of time when the engine is driven.

As shown in FIG. 6, if the running power of the plug-in hybrid vehicle is less than an engine startup threshold value, the plug-in hybrid vehicle runs using only the driving force of the second motor-generator 120.

If, on the other hand, the running power of the plug-in hybrid vehicle is equal to or greater than the engine startup threshold value, the engine 100 is driven. As a result, the plug-in hybrid vehicle runs using the driving force of the engine 100 in addition to, or instead of, the driving force of the second motor-generator 120. Also, the power generated by the first motor-generator 110 using the driving force of the engine 100 is supplied directly to the second motor-generator 120. The time T for which the engine 100 continues to be stopped is measured by a counter in the ECU 170, for example.

The running power is calculated by the ECU 170 according to a map having the operation amount of an accelerator pedal that is operated by a driver (i.e., the accelerator operation amount) and the vehicle speed or the like, for example, as parameters. That is, in this example embodiment, the running power of the plug-in hybrid vehicle represents the power requested by the driver. Incidentally, the method of calculating the running power is not limited to this.

The plug-in hybrid vehicle is controlled such that the running power is realized shared by the engine 100 and the second motor-generator 120. For example, when the first motor-generator 110 is not generating power, the sum of the output power of the engine 100 and the output power of the second motor-generator 120 is controlled to be substantially equal to the running power. Therefore, if the output power of the engine 100 is zero, the output power of the second motor-generator 120 is controlled to be substantially equal to the running power. Also, if the output power of the second motor-generator 120 is zero, the output power of the engine 100 is controlled to be substantially equal to the running power. Incidentally, the manner in which the output power is controlled is not limited to this.

The engine startup threshold value in the CD mode is larger than the engine startup threshold value in the CS mode. That is, the region in which the engine 100 is stopped and the plug-in hybrid vehicle runs by only the driving force of the second motor-generator 120 in the CD mode is larger than the region in which the engine 100 is stopped and the plug-in hybrid vehicle runs by only the driving force of the second motor-generator 120 in the CS mode. Accordingly, in the CD mode, the engine 100 is stopped and the plug-in hybrid vehicle is controlled to run by mainly only the driving force of the second motor-generator 120. On the other hand, the frequency with which the engine 100 is driven in the CS mode is higher than the frequency with which the engine 100 is driven in the CD mode. Therefore, in the CS mode, the plug-in hybrid vehicle is controlled to run efficiently using both the engine 100 and the second motor-generator 120.

The power charged to the battery 150 in the CD mode is less than the power charged to the battery 150 in the CS mode. More specifically, in the CS mode, the charging power of the battery 150 is determined according to the SOC of the battery 150. The engine 100 is driven such that power corresponding to the determined charging power can be generated using the first motor-generator 110. On the other hand, in the CD mode, the charging power of the battery 150 is normally determined to be zero. That is, in the CD mode, the power obtained by regenerative braking is charged to the battery 150, but the engine 100 is not driven to charge the battery 150.

Therefore, in the CD mode, power stored in the battery 150, in particular, power supplied from the external power supply 402 outside the plug-in hybrid vehicle, is actively consumed.

Accordingly, if the battery 150 is frequently charged using the external power supply 402 outside the plug-in hybrid vehicle, and the plug-in hybrid vehicle is driven such that the running power does not exceed the engine startup threshold value, the engine 100 may not be driven for an extended period of time.

Therefore, in this example embodiment, if the period of time during which the engine 100 continues to be stopped becomes long, the engine 100 is forcibly started.

Figure 7:
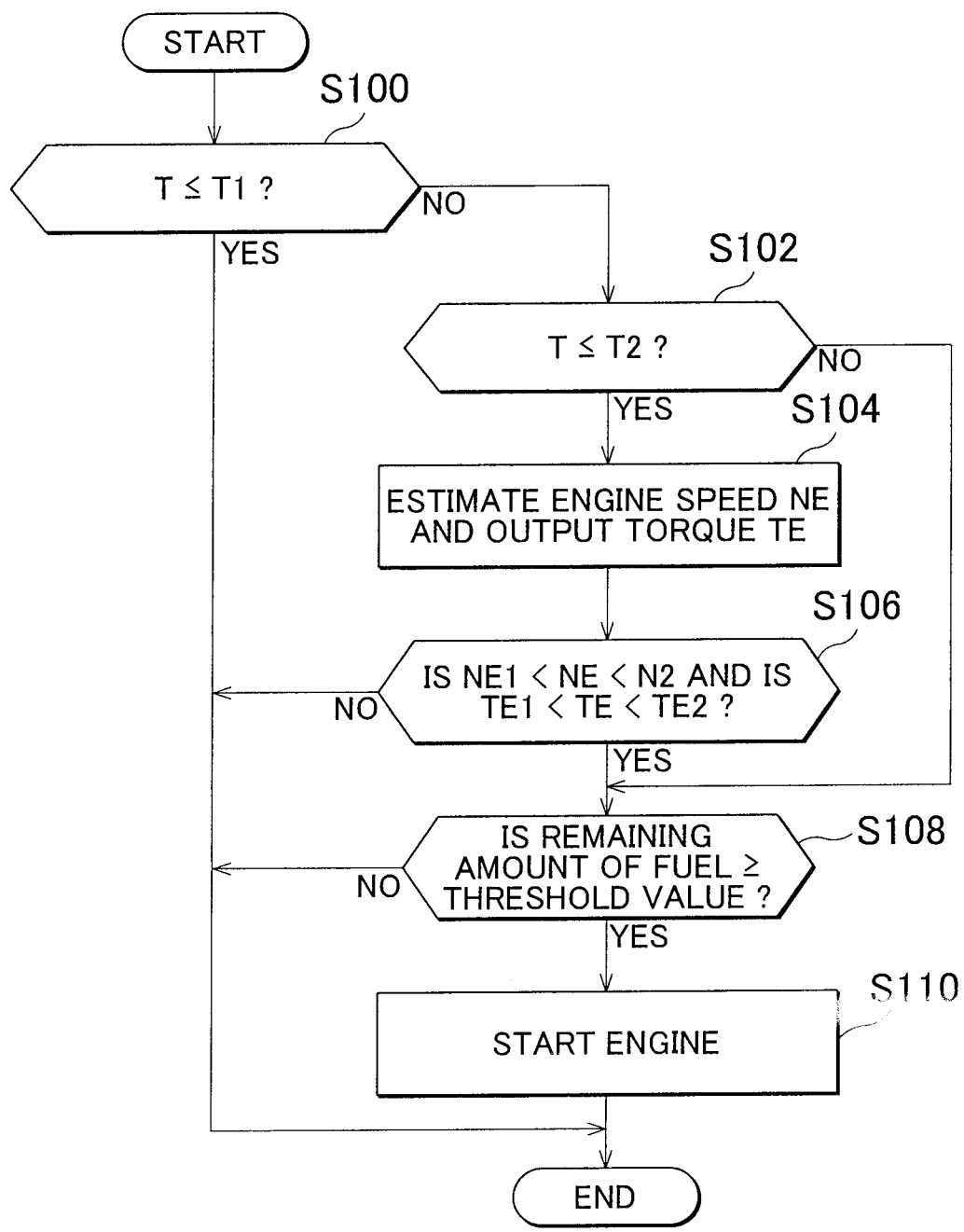
FIG. 7 is a flowchart illustrating the control structure of a routine executed by an ECU according to a first example embodiment of the invention.

A routine executed by the ECU 170 will now be described with reference to FIG. 7. The following routine is executed when a hybrid system is turned on, for example. This routine may be realized by software or by hardware.

In step S100, the ECU 170 determines whether the time T for which the engine 100 has remained stopped is equal to or less than a threshold value T1. If the time T for which the engine 100 has remained stopped is equal to or less than the threshold value T1 (i.e., YES in step S100), this cycle of the routine ends. If, however, the time T for which the engine 100 has remained stopped is longer than the threshold value T1 (i.e., NO in step S100), the process proceeds on to step S102.

Incidentally, instead of determining whether the time T for which the engine 100 has remained stopped is equal to or less than the threshold value T1, it may be determined whether an amount of evaporated fuel (i.e., an amount of fuel vapor) from a fuel tank, not shown, that is trapped in a canister, also not shown, is equal to or less than a threshold value A1. The amount of fuel vapor becomes larger as the time T for which the engine 100 continues to be stopped becomes longer, so the time T for which the engine 100 continues to be stopped can be indirectly evaluated using the amount of fuel vapor. The method for calculating the amount of fuel vapor may be any known typical method, so a detailed description thereof will not be repeated here.

In step S102, the ECU 170 determines whether the time T for which the engine 100 continues to be stopped is equal to or less than a threshold value T2 that is longer than the threshold value T1. If the time T for which the engine 100 continues to be stopped is equal to or less than the threshold value T2 (i.e., YES in step S102), the process proceeds on to step S104. If, on the other hand, the time T for which the engine 100 continues to be stopped is longer than the threshold value T2 (i.e., NO in step S102), the process moves ahead to step S108.

Incidentally, instead of determining whether the time T for which the engine 100 has remained stopped is equal to or less than the threshold value T2, it may be determined whether an amount of evaporated fuel (i.e., an amount of fuel vapor) from a fuel tank, not shown, that is trapped in a canister, also not shown, is equal to or less than a second threshold value A2 that is larger than the threshold value A1.

In step S104, the ECU 170 estimates an engine speed NE and an output torque TE of the engine when the engine 100 is driven in order to realize the running power of the plug-in hybrid vehicle, i.e., to realize the power requested by the driver.

In this example embodiment, because the engine 100 is controlled to realize the engine speed NE and the output torque TE set according to the power requested of the engine 100, the engine speed NE and the output torque TE are estimated using the running power of the plug-in hybrid vehicle as the power requested of the engine 100.

Figure 8:
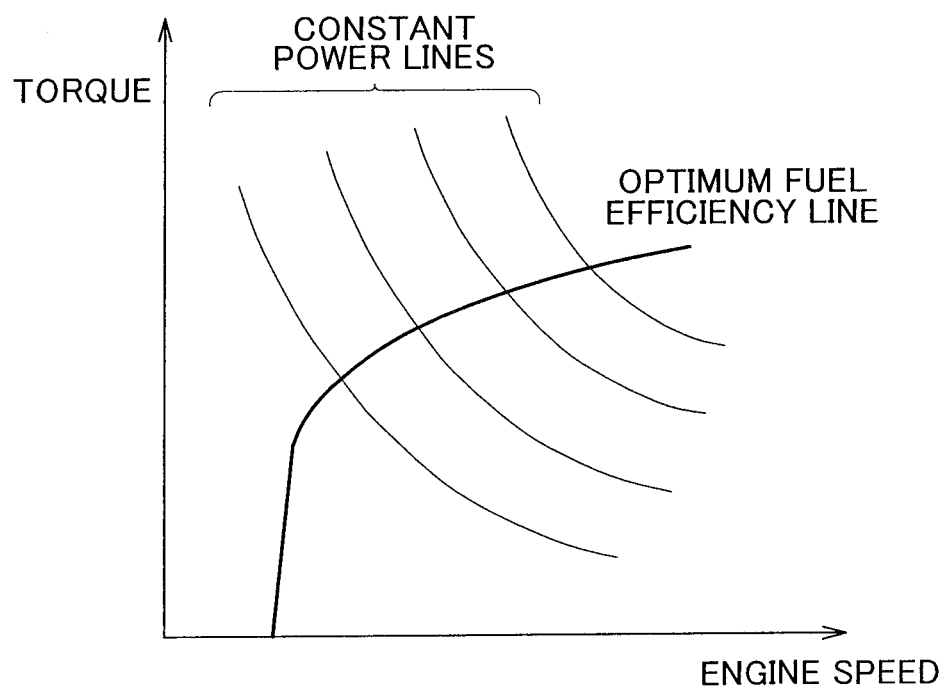
FIG. 8 is a view of a map used for setting and estimating the engine speed and output.

In this example embodiment, the engine speed NE and the output torque TE are determined by the intersection of a curve set to realize the optimum fuel efficiency and a constant power line, as shown in FIG. 8, for example. That is, the engine speed NE and the output torque TE that realize the best fuel efficiency are selected from among the engine speed NE and the output torque TE that realize the requested power.

A map used to set and estimate the engine speed NE and the output torque TE is created in advance by the developer based on test and simulation results. Incidentally, the method for estimating the engine speed NE and the output torque TE is not limited to this.

Returning now to FIG. 7, in step S106, the ECU 170 determines whether the estimated engine speed NE is greater than a first speed NE1 and less than a second speed NE2 that is greater than the first speed NE1, and whether the estimated output torque TE is greater than a first torque TE1 and less than a second torque TE2 that is greater than the first torque TE1.

Incidentally, the operating range in which the engine speed NE is greater than the first speed NE1 and less than the second speed NE2, and in which the output torque TE of the engine is greater than the first torque TE1 and less than the second torque TE2 is a range that is determined to have good fuel efficiency based on the results of tests and simulations and the like.

If the estimated engine speed NE is greater than the first speed NE1 and less than the second speed NE2 that is greater than the first speed NE1, and the estimated output torque TE is greater than the first torque TE1 and less than the second torque TE2 that is greater than the first torque TE1 (i.e., YES in step S106), the process proceeds on to step S108. If not (i.e., NO in step S106), then this cycle of the routine ends.

In step S108, the ECU 170 determines whether the remaining amount of fuel (such as gasoline, gas oil, or alcohol fuel) stored in the fuel tank is equal to or greater than a preset threshold value. If the remaining amount of fuel is equal to or greater than the threshold value (i.e., YES in step S108), the process proceeds on to step S110. If not (i.e., NO in step S108), then this cycle of the routine ends.

In step S110, the ECU 170 starts the engine 100. The manner in which the engine 100 according to this example embodiment is controlled will now be described based on the structure and flowchart described above.

If the time T for which the engine 100 continues to be stopped is longer than the threshold T1 (i.e., NO in step S100) and also longer than the threshold value T2 (i.e., NO in step S102), the engine 100 is forcibly started (step S110). As a result, the oil pump 106 can be driven, so the drive train and the like can be sufficiently lubricated.

If, on the other hand, the time T for which the engine 100 continues to be stopped is longer than the threshold value T1 (i.e., NO in step S100) and equal to or less than the threshold value T2 (i.e., YES in step S102), the engine speed NE and the output torque TE are estimated when the engine 100 is driven to realize the running power of the plug-in hybrid vehicle (step S104).

If the estimated engine speed NE is greater than the first speed NE1 and less than the second speed NE2 that is greater than the first speed NE1, and the estimated output torque TE is greater than the first torque TE1 and less than the second torque TE2 that is greater than the first torque TE1 (i.e., YES in step S106), then it is determined whether the remaining amount of fuel stored in the fuel tank is equal to or greater than a preset threshold value (step S108). If the remaining amount of fuel is equal to or greater than the threshold value (i.e., YES in step S108), then the engine 100 is started (step S110). As a result, the engine 100 can be forcibly started in an operating range with good fuel efficiency.

<Second Example Embodiment>

Hereinafter, a second example embodiment of the invention will be described. In the second example embodiment, the engine 100 is driven in an operating state (such as the output torque and rotation speed) in which the efficiency of the engine 100 is equal to or greater than a preset efficiency. The other aspects of the second example embodiment are the same as those of the first example embodiment, so detailed descriptions thereof will not be repeated here.

Figure 9:
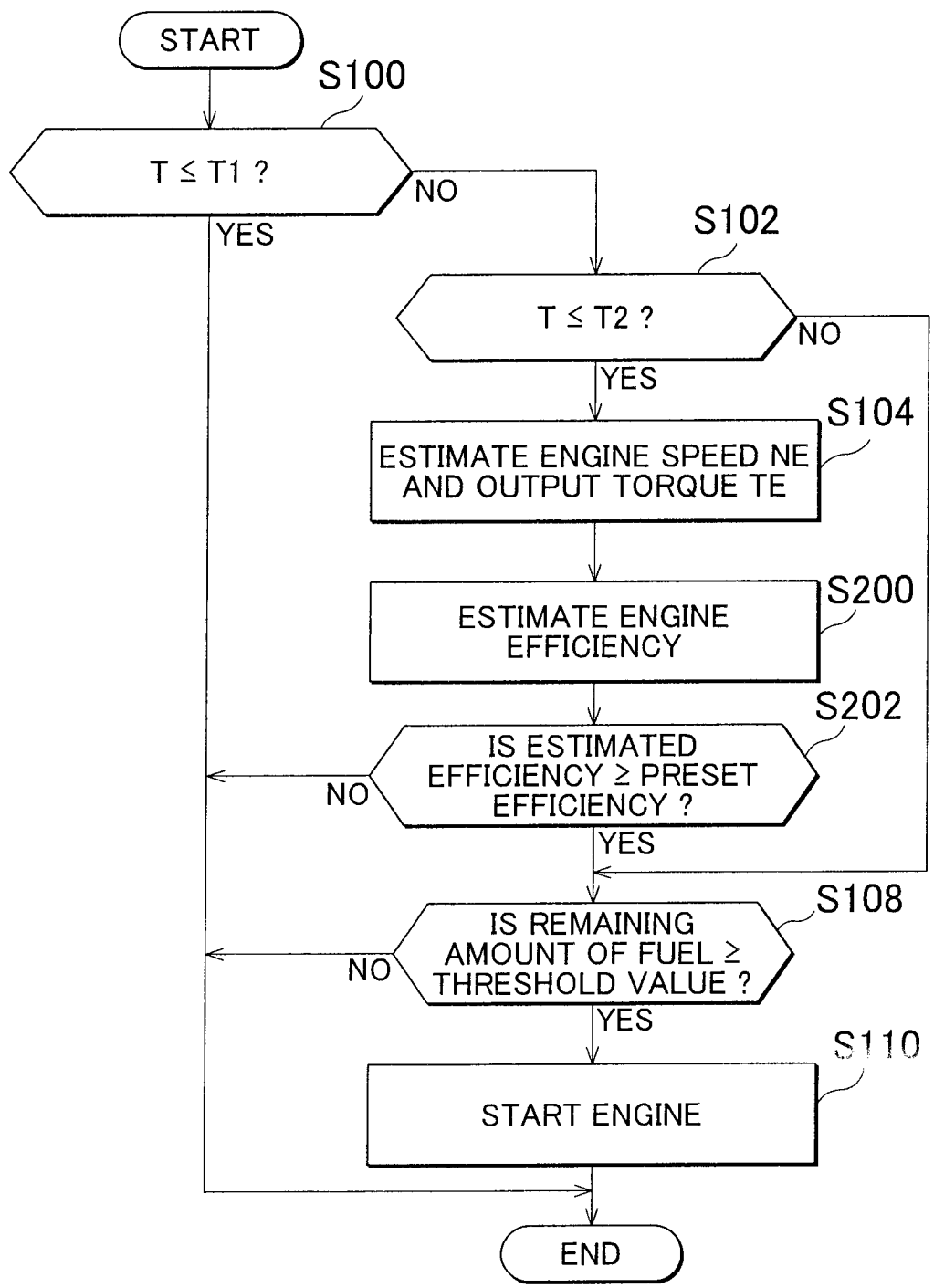
FIG. 9 is a flowchart illustrating the control structure of a routine executed by the ECU according to a second example embodiment of the invention.

A routine executed by the ECU 170 will now be described with reference to FIG. 9. The following routine is executed when a hybrid system is turned on, for example. This routine may be realized by software or by hardware. Steps in this routine that are the same as those in the routine of the first example embodiment will be denoted by the same step numbers, so detailed descriptions thereof will not be repeated here.

Figure 10:
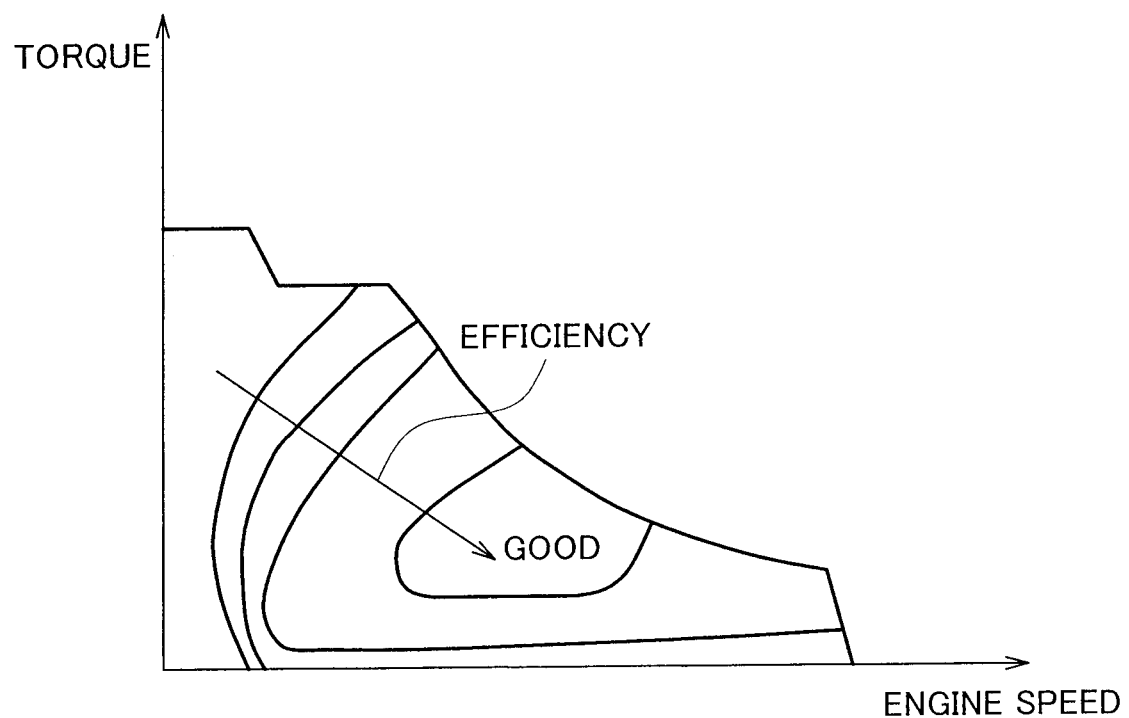
FIG. 10 is a view of a map used for estimating efficiency.

In step S200, the ECU 170 estimates the efficiency of the engine 100 according to the estimated engine speed NE and the estimated output torque TE. As shown in FIG. 10, the efficiency is estimated according to a map having the engine speed NE and the output torque TE, for example, as parameters. The map is created in advance by the developer based on the results of tests and simulations and the like. Incidentally, the method for estimating the efficiency is not limited to this.

Returning now to FIG. 9, in step S202, the ECU 170 determines whether the estimated efficiency is equal to or greater than a preset efficiency. If the estimated efficiency is equal to or greater than the preset efficiency (i.e., YES in step S202), the routine proceeds on to step S108. If not (i.e., NO in step S202), then this cycle of the routine ends.

With this structure as well, effects that are substantially similar to those obtained by the first example embodiment are able to be obtained.

<Third Example Embodiment>

Hereinafter, a third example embodiment of the invention will be described. In the third example embodiment, the engine 100 is driven in an operating state in which the efficiency of a hybrid system that includes the engine 100, the first motor-generator 110, and the second motor-generator 120 is equal to or greater than a preset efficiency. The other aspects of the third example embodiment are the same as those of the first or second example embodiment, so detailed descriptions thereof will not be repeated here.

Figure 11:
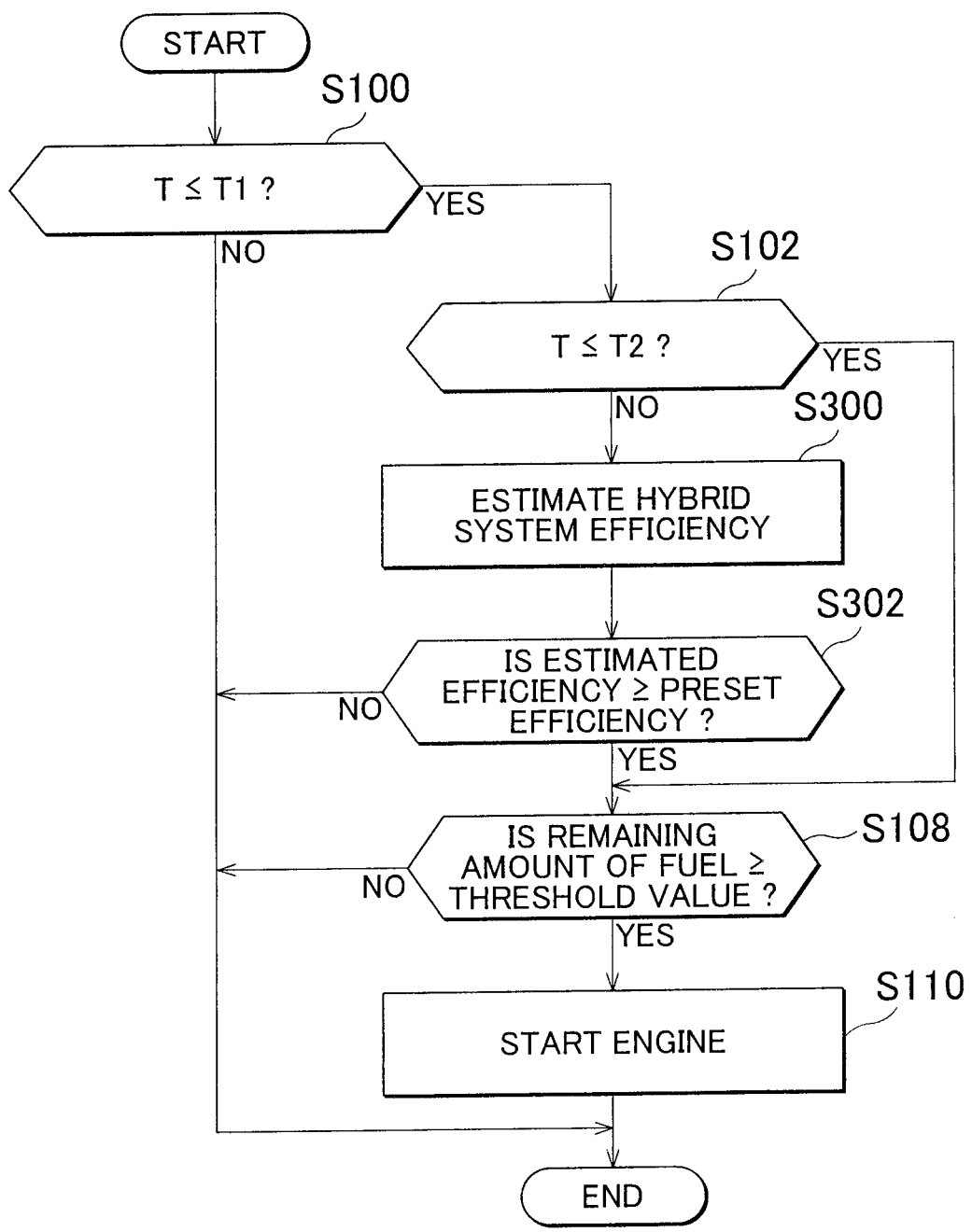
FIG. 11 is a flowchart illustrating the control structure of a routine executed by the ECU according to a third example embodiment of the invention.

A routine executed by the ECU 170 will now be described with reference to FIG. 11. The following routine is executed when the hybrid system is turned on, for example. This routine may be realized by software or by hardware. Steps in this routine that are the same as those in the routine of the first example embodiment will be denoted by the same step numbers, so detailed descriptions thereof will not be repeated here.

In step S300, the ECU 170 estimates the efficiency of the hybrid system that includes the engine 100, the first motor-generator 110, and the second motor-generator 120. The efficiency of the hybrid system assuming that the second motor-generator 120 is not being operated is estimated, for example. That is, the sum of the efficiency of the engine 100 and the efficiency of the first motor-generator 110 is calculated. When the engine 100 is forcibly driven, it is assumed that the running power of the vehicle is realized by only the engine 100, so the efficiency of the hybrid system assuming that the second motor-generator 120 is not being operated is estimated.

The efficiency is estimated according to a map of the relationship of the efficiency and various operating states (such as the output torque and rotation speed), that is created based on the results of tests and simulations and the like, for example.

In step S302, the ECU 170 determines whether the estimated efficiency is equal to or greater than a preset efficiency. If the estimated efficiency is equal to or greater than a preset efficiency (i.e., YES in step S302), the process proceeds on to step S108. If not (i.e., NO in step S302), then this cycle of the process ends.

With this structure as well, effects that are substantially similar to those obtained by the first or second example embodiment are able to be obtained.

<Other Example Embodiments>

Figure 12:
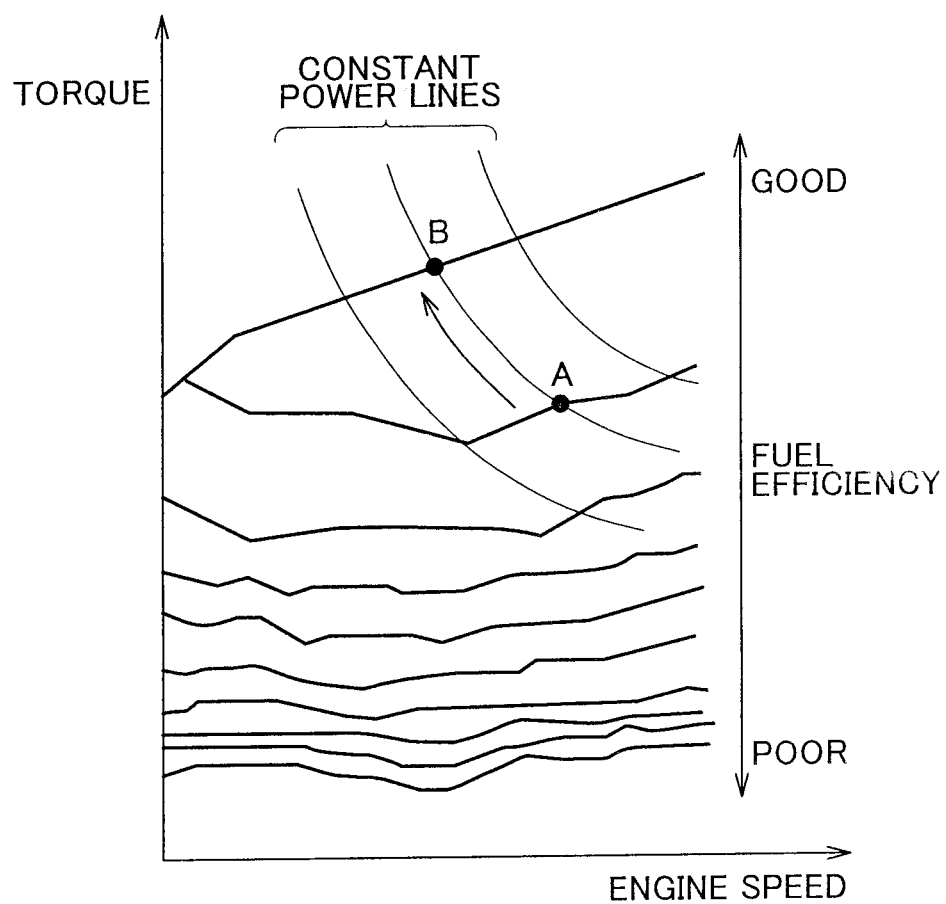
FIG. 12 is a view of the engine state at various fuel efficiencies.

At least one of the engine speed NE or the output torque TE may be changed to increase the efficiency of the engine 100 after starting the engine 100 in the first through the third example embodiments. For example, the starting point of the engine 100 may be changed from A to B to improve fuel efficiency, as shown in FIG. 12. As a result, the amount of fuel consumed is able to be further reduced.

Also, the ratio of the output power of the engine 100 and the output power of the second motor-generator 120 may be changed to increase the efficiency of the engine 100. For example, the output power of the engine 100 may be reduced to increase the efficiency of the engine 100, and the output power of the second motor-generator 120 may be increased by the amount that the output power of the engine 100 is reduced. Conversely, the output power of the engine 100 may be increased to increase the efficiency of the engine 100, and the output power of the second motor-generator 120 may be reduced by the amount that the output power of the engine 100 is increased. As a result, the amount of fuel consumed is able to be further reduced, and fluctuation in output power of the vehicle as a whole is able to be suppressed.

While the invention has been described with reference to example embodiments thereof, it is to be understood that the invention is not limited to the described embodiments or constructions. The invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A starting system of an engine mounted in a vehicle capable of running using torque output from an electric motor, comprising:
 a detection portion that detects power requested by a driver;
 a estimation portion that estimates engine speed and output torque of the engine when the engine is driven to realize the power requested by the driver;
 a comparing portion that compares a time for which the engine continues to be stopped with a first time and a second time that is longer than the first time;
 a determining portion that determines whether the estimated engine speed is greater than a first speed and less than a second speed that is greater than the first speed, and the estimated output torque is greater than a first value and less than a second value that is greater than the first value, when the time for which the engine continues to be stopped is longer than the first time and shorter than the second time;
 a first starting portion that starts the engine when the estimated engine speed is greater than the first speed and less than the second speed, and the estimated output torque is greater than the first value and less than the second value; and
 a second starting portion that starts the engine when the time for which the engine continues to be stopped is longer than the second time.

2. The starting system of an engine according to claim 1, further comprising:
 a portion that changes at least one of the engine speed or the output torque to increase efficiency of the engine.

3. The starting system of an engine according to claim 1, further comprising:
 a portion that changes a ratio of output power of the engine and output power of the electric motor to increase efficiency of the engine.

4. The starting system of an engine according to claim 1, wherein the comparing portion includes a portion that compares the time for which the engine continues to be stopped with the first time and the second time, by comparing an amount of fuel vapor of the engine with a first amount and a second amount that is greater than the first amount.

5. A starting method of an engine mounted in a vehicle capable of running using torque output from an electric motor, comprising:
 detecting power requested by a driver;
 estimating engine speed and output torque of the engine when the engine is driven to realize the power requested by the driver;
 comparing a time for which the engine continues to be stopped with a first time and a second time that is longer than the first time;
 determining whether the estimated engine speed is greater than a first speed and less than a second speed that is greater than the first speed, and the estimated output torque is greater than a first value and less than a second value that is greater than the first value, when the time for which the engine continues to be stopped is longer than the first time and shorter than the second time;
 starting the engine when the estimated engine speed is greater than the first speed and less than the second speed, and the estimated output torque is greater than the first value and less than the second value; and
 starting the engine when the time for which the engine continues to be stopped is longer than the second time.

* * * * *